(12) United States Patent
Huber et al.

(10) Patent No.: US 6,270,300 B1
(45) Date of Patent: Aug. 7, 2001

(54) CARGO LATCH

(75) Inventors: Thomas Huber, Iffeldorf; Richard Holzner, Dorfen, both of (DE)

(73) Assignee: Telair International GmbH, Hausham (DE)

( * ) Notice: Subject to any disclaimer, the term of this patent is extended or adjusted under 35 U.S.C. 154(b) by 0 days.

(21) Appl. No.: 09/293,461

(22) Filed: Apr. 15, 1999

(30) Foreign Application Priority Data

Apr. 16, 1998 (DE) .............................................. 198 16 892

(51) Int. Cl.[7] .............................. B06P 1/64; B63B 25/00; B64C 1/22
(52) U.S. Cl. ......................... 410/69; 410/80; 244/118.1
(58) Field of Search ................. 410/77, 78, 79, 410/82, 83, 69, 92, 80; 414/536; 244/118.1, 137.1

(56) References Cited

U.S. PATENT DOCUMENTS

| | | | |
|---|---|---|---|
| 3,447,665 | 6/1969 | Egeland et al. | 198/127 |
| 3,465,998 | * 9/1969 | Ginn | 410/77 |
| 3,712,454 | 1/1973 | McKee | 198/127 R |
| 3,906,870 | * 9/1975 | Alberti | 410/79 |
| 4,589,542 | 5/1986 | Steadman | 198/782 |
| 5,011,348 | * 4/1991 | Jensen et al. | 410/69 X |
| 5,183,150 | 2/1993 | Chary et al. | 198/782 |
| 5,213,201 | 5/1993 | Huber et al. | 198/781 |
| 5,265,991 | 11/1993 | Herrick et al. | 410/69 |
| 5,316,242 | * 5/1994 | Eilenstein-Wiegmann et al. | 244/137.1 |

FOREIGN PATENT DOCUMENTS

| | | |
|---|---|---|
| 19 56 946 | 11/1970 | (DE) . |
| 39 19 613 A1 | 12/1990 | (DE) . |
| 43 36 978 A1 | 5/1995 | (DE) . |
| 195 39 627 A1 | 5/1996 | (DE) . |
| 0 355 251 B1 | 2/1990 | (EP) . |
| 0 497 045 A1 | 8/1992 | (EP) . |
| WO 96/28719 | 9/1996 | (WO) . |

* cited by examiner

*Primary Examiner*—D. Glenn Dayoan
*Assistant Examiner*—Scott Carpenter
(74) *Attorney, Agent, or Firm*—Knobbe, Martens, Olson & Bear, LLP

(57) ABSTRACT

A cargo latch is provided for use in restraining objects such as containers, pallets and the like, against movement with respect to a floor of a cargo hold, in particular the cargo hold of an aircraft. The latch comprises a frame with a shaft disposed therein and a base, a lower end of which is rotatably mounted on the shaft. The base can therefore pivot with respect to the frame. At least one restraining hook is pivotally mounted to an upper end of the base.

3 Claims, 3 Drawing Sheets

CARGO LATCH

FIELD OF THE INVENTION

The present invention relates to a cargo latch for use in restraining objects such as containers, pallets and the like, against movement with respect to a floor of a cargo hold, in particular the cargo hold of an aircraft.

DESCRIPTION OF THE PRIOR ART

To secure containers, pallets and the like in particular to the floor of a cargo hold in an aircraft, latches are known that comprise a frame and at least one latch hook or restraining hook.

The latch described in U.S. Pat. No. 5,265,991 comprises a frame to attach the latch to the floor of the cargo hold and a base pivotably mounted on the frame. The base comprises at its end away from the frame two hooked lugs pointing away from one another, which are integrally joined to the base and can be pivoted therewith. The arrangement of frame, base and hooked lug formed together with the base is so constructed that the hooked lug overlaps and rests on a holding strip of a freight container when the latter is in its final storage position, securing the container against vertical and lateral slippage. The base further forms a lateral guide mechanism when the container is being moved into its final storage position. The base together with the hooked lug can be pivoted to the left, out of its vertical operating position into a resting position, and to the right into a retracted position below the floor of the cargo space. A spring urges the base, together with its integrally formed hooked lug, out of the retracted position or out of the resting position into a vertical operating position. When the base is in the resting position, a manually actuated catch keeps it releasably in that position.

In practice it is common for a container being moved into its final storage position to strike the hooked lug-bearing base of the latch from the side, or the projections or holding strips of the container provided for its immobilization scrape against the base. In this case the base is pivoted in the direction of container movement, and the hooked lugs that pivot along with the base can become caught against the projections or a holding strip of the container. Then it is necessary to move the container back and forth several times so that the container can ultimately be brought into its correct storage position and secured there in the lateral and vertical directions by the the latches so designed. This sort of jamming delays loading and unloading of the cargo space and, because the operating personnel are under time pressure during these processes, often makes them take rather harsh measures in order to store the containers as quickly as possible. The use of force not uncommonly damages the latch in ways so subtle that they are not noticed at first but later, as a result of the severe vibration during flight, can make the latch nonfunctional. If several latches are so damaged, there is a risk that during the flight the freight container will no longer be held securely in its final storage position.

SUMMARY OF THE INVENTION

The object of the present invention is to provide a cargo latch which has an increased reliability but with little added cost.

According to the present invention there is provided a cargo latch for restraining an object against movement with respect to a floor of a cargo hold, comprising a frame, a first shaft fixedly mounted within the frame, a base comprising an upper end and a lower end which is rotatably mounted on the shaft in order that the base can be pivoted with respect to the frame, and a restraining hook which is pivotally mounted to the upper end of the base.

A first important aspect of the invention is that the restraining hook is not integrally formed with the base, which can be pivoted with respect to the frame of the latch; instead, the base is provided with at least one restraining hook that can be pivoted with respect to the base of the latch. Hence, when a container or the like strikes the latch from the side, the base folds down in the direction of movement and as it does so, the pivotable restraining hook also moves out of the way. This effectively prevents the container from becoming jammed against the latch and the container can then be brought into its final storage position without difficulty. A base that has been so pivoted can then raises itself back into a vertical operating or restraining position, and a restraining hook that pivots with respect to the base can likewise rotate into its operating or restraining position above a holding strip of the container or the like and hence secure the container against lateral or vertical slippage. Because a cargo latch in accordance with the invention does not become jammed against the container, the operating staff can rapidly and unproblematically bring the container into its final storage position, and there is no need to force the container against the latch.

Another important aspect of the invention is that the side surface of the base that faces the container is provided with a passage or an aperture to accommodate a roller means such as a deflecting or guide roller, which projects somewhat beyond the side surface of the base. This measure facilitates the transport of the container or the like into its final storage position. In addition, the deflecting roller absorbs impacts during the transport of the container into its final storage position and also reduces the risk of damage to the latch. Furthermore, because of the deflecting roller it is possible to reduce the maintenance frequency of the cargo latch without making it less reliable. Instead of replacing the whole cargo latch, it often suffices merely to replace the deflecting roller.

Advantageously, the deflecting roller is mounted on a shaft or axle which passes through the base and about which the restraining hook also rotates, so that only a few manual operations are needed, e.g. in the course of maintenance work, to replace both the deflecting roller and the restraining hook. The multifunctional application of this axle or shaft for pivoting the restraining hook also means that no additional elements are needed and that a cargo latch in accordance with the invention is lightweight and of small dimensions. The use of few components to construct the latch enables uncomplicated maintenance and manufacture of the latch, which improves the security and reliability of the latch.

The invention will now be described by way of example with reference to the accompanying drawings.

DESCRIPTION OF A PREFERRED EMBODIMENT

Figure 1:
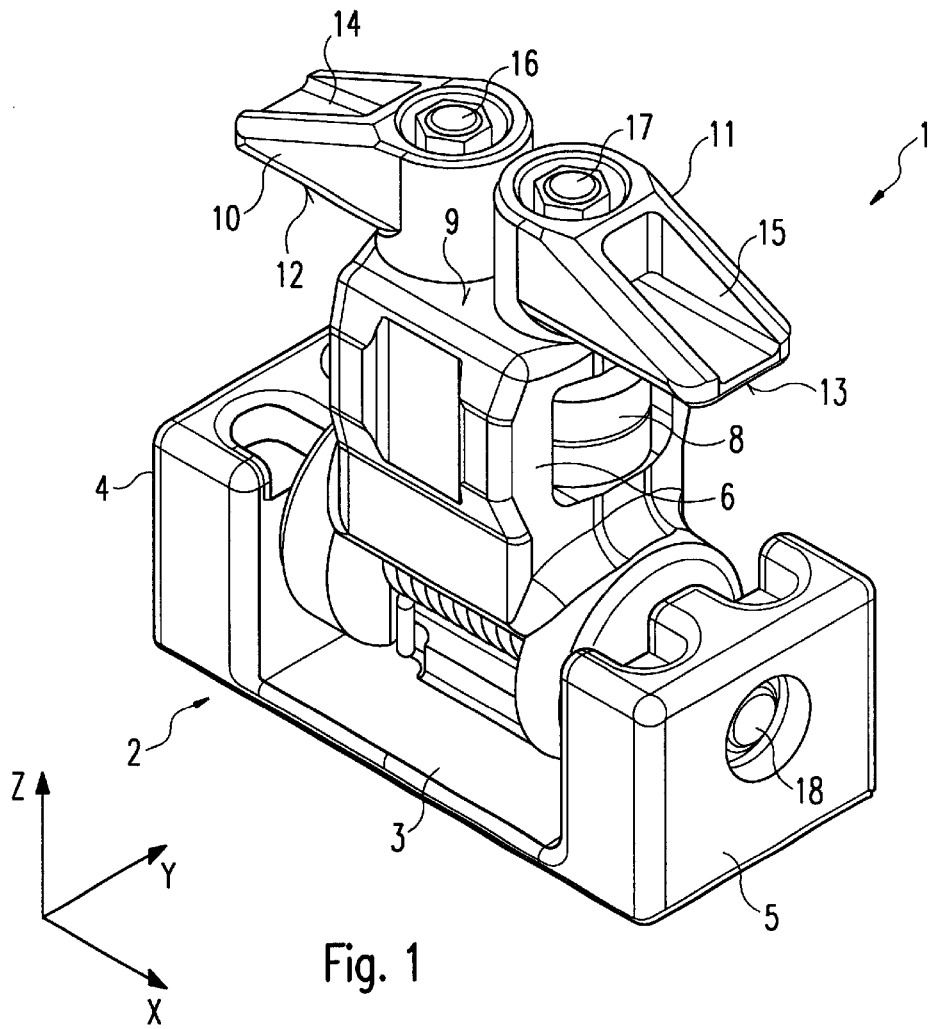
FIG. 1 is a perspective view of a cargo latch according to the invention with a pivotable base and a pivotable restraining hook in their operating position.

In the following description, the same reference numerals are used for identical components, or parts and components with identical actions.

Figure 5:
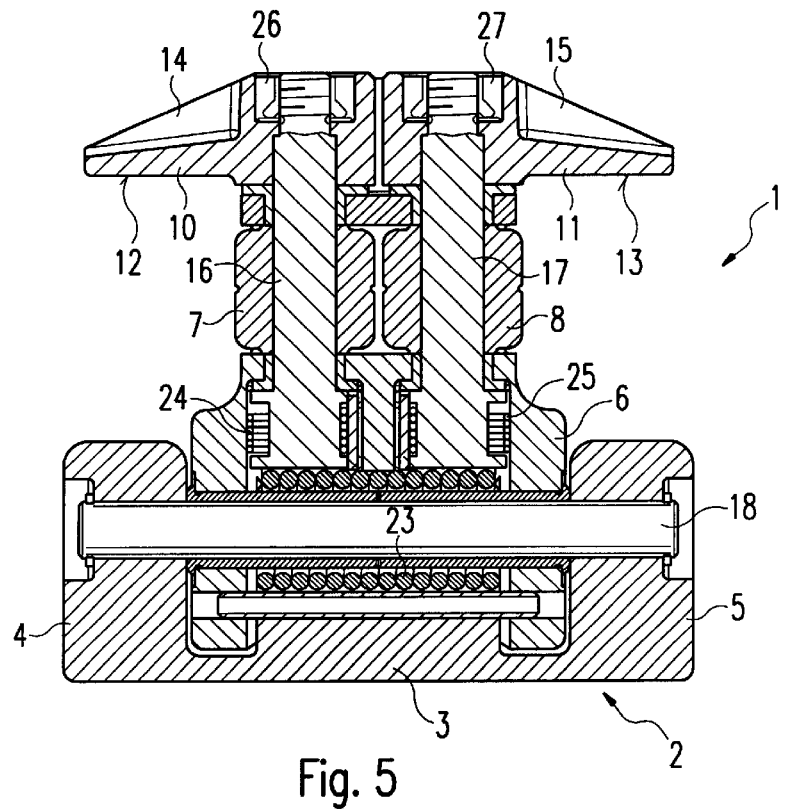
FIG. 5 is a sectional view along the line I—I in FIG. 2.
Figure 6:
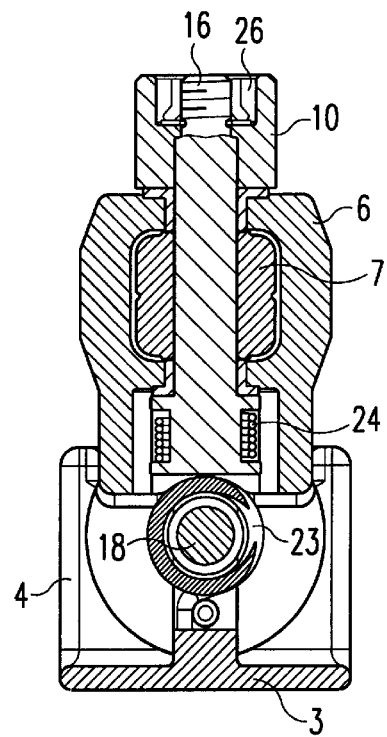
FIG. 6 is a sectional view along the line II—II in FIG. 2.

In FIGS. 1, 5 and 6 a cargo latch in accordance with the invention, with a U-shaped frame 2 and a base 6 that can be pivoted within the frame 2, is shown in its operating or restraining position. Above a covering surface 9 of the base 6 are disposed a first restraining hook 10 and a second restraining hook 11, each of which can be rotated parallel to the covering surface 9 of the base 6. The U-shaped frame 2 comprises a bottom portion 3, a first side part 4 and a second side part 5. Mounted in the first side part 4 and the second side part 5 respectively are the first and second ends of a first shaft 18. Within the U-shaped opening of the frame 2 is situated a lower end of the base 6, which encloses the shaft 18 and which is mounted on the shaft 18 in the manner of a connecting rod in order that it can be pivoted with respect to the frame 2. The shaft 18 is surrounded by a spring 23 in the region of the U-shaped opening of the frame 2. One end of the spring 23 is connected to the lower end of the base 6, and the other end of the spring 23 is so connected to the frame 2 that when the base 6 is deflected out of the vertical operating position, the spring 23 applies a force to the base 6 which, in the absence of an externally applied force, urges the base 6 out of the position into which it has been deflected in a positive or negative Y direction, as shown in the drawings, thus returning the base 6 to its operating position, which is substantially vertical with respect to the frame 2. In this process, the lower end of the base 6 rotates about the shaft 18, upon which it is seated.

In the base 6, a second shaft 16 and a third shaft 17 are rotatably mounted. The two shafts 16 and 17 are separated from one another and are oriented in the Z direction. The ends of the two shafts that project upward from the covering surface 9 of the base 6, namely the upper end of the second shaft 16 and that of the third shaft 17, are both slightly tapered and in their outermost parts are externally threaded. On the tapering end of the shaft 16 is seated the restraining hook 10. The tapered portion of the shaft 16 engages within a bore in the first restraining hook 10, which bore is also tapered in a complementary direction in order that the height of the first restraining hook 10 above the covering surface 9 when the hook is seated on the shaft 16 is predetermined. In the same way, a partially tapered bore is provided in the second restraining hook 11, which engages a tapered portion of the shaft 17 so as to predetermine the Z position of the second restraining hook 11 above the covering surface 9. By this means, when the first restraining hook 10 and the second restraining hook 11 rotate on the covering surface 9 of the base 6, their positional relationships are determined. In the Z direction, the position of the first restraining hook 10 is fixed by a nut 26, which is screwed onto the external thread at the outermost end of the shaft 16. Similarly, a nut 17, which is screwed onto the external thread at the outermost end of the shaft 17, prevents the second restraining hook 11 from unintentionally becoming detached from the shaft 17 in the Z direction.

The first and second restraining hooks 10 each have a nose shape and are preferably form-fitted onto their associated shafts 16 and 17 in such a way that the first restraining hook 10 points in a negative X direction whereas the second restraining hook 11 points in a positive X direction. The first restraining hook 10 has a flat lower surface 12, which is substantially parallel to the bottom 3 of the frame 2. In order particularly to minimize weight, part of the first restraining hook 10 is cut away to define a triangular groove 14 which is open at one end. The second restraining hook 11 is identical to the first restraining hook 10 and likewise has a flat lower surface 13 parallel to the bottom 3 of the frame 2 and defines a half-open triangular groove 15.

The lower end of the shaft 16, which extends into the base 6, is surrounded by a spring 24 (see FIGS. 4 and 5), a first end of which is attached to the base 6 and a second end of which is fixed to the rotatable shaft 16. In this way when the first restraining hook 10 is deflected from its operating position, in which it points directly away from the X direction, the spring 24 exerts upon the shaft 16 a spring force which, in the absence of an effective external force, moves the rotatable first restraining hook 10 back into its operating position. In this process, the shaft 16 rotates within the base 6. In just the same way, the lower end of the shaft 17, which likewise extends into the base 6, is surrounded by a second spring 25, a first end of which is attached to the base 6 and a second end of which is fixed to the second shaft 17. The spring 25 rotates in the base 6, so that when the second restraining hook 11 is deflected from its operating position, in which it points in the X direction, the second spring 25 exerts upon the shaft 17 a spring force which, in the absence of an effective external force, moves the second restraining hook 11 back into its operating position.

A horizontal passageway or aperture extends through the base 6 in the X direction. In the region of the horizontal passage through the base 6, a first deflecting roller 7 encloses the shaft 16, and a second deflecting roller 8 encloses the shaft 17. The first deflecting roller 7 is rotatably mounted on the shaft 16, as is the second deflecting roller 8 on the shaft 17. The first deflecting roller 7 projects outwardly from the aperture in the base 6 in a negative X direction. In an analogous manner, the second deflecting roller 8 projects outwardly from the aperture in the base 6 in a positive X direction, and forms a guide for a holding strip on a container or the like that is being transported into a final storage position and which having reached that final storage position is held in a vertical direction by the restraining hooks 10 and 11 and in a lateral direction by the base 6 of at least one latch 1.

Figure 2:
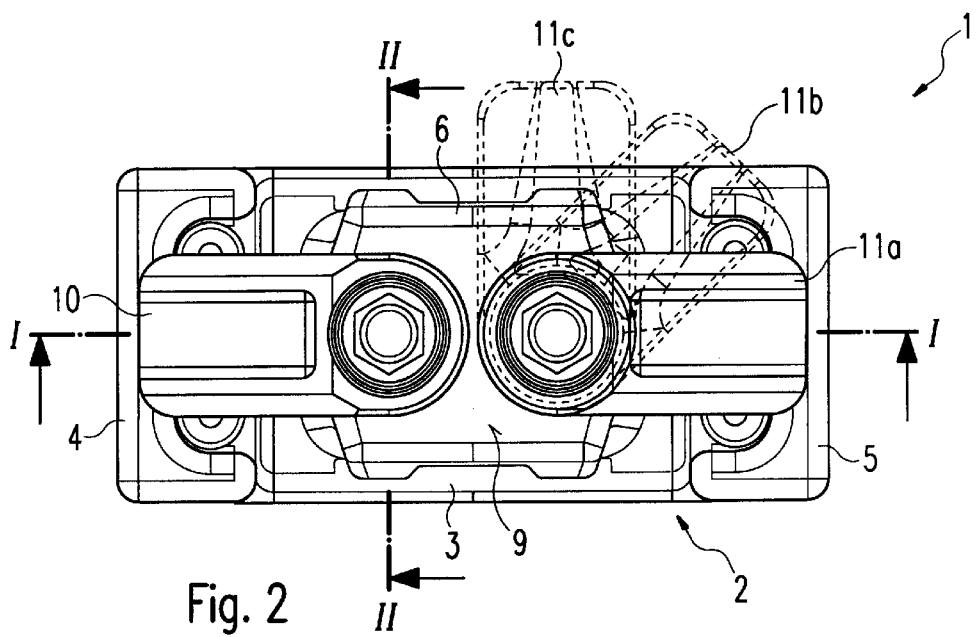
FIG. 2 is a plan view of the cargo latch shown in FIG. 1, in which one of two pivotable restraining hooks is shown in its operating position as well as pivoted through 45° and 90°.

FIG. 2 shows the cargo latch of FIG. 1 in plan view. The reference numeral 11a shows the second restraining hook 11 in its operating position, whereas 11b shows in dashed outline the restraining hook 11 in a position rotated by 45° counterclockwise, and finally the reference 11c shows in dashed outline the second restraining hook 11 rotated 90° counterclockwise out of its operating position. The second restraining hook 11 can also be rotated clockwise out of its operating position, at least in the range from 0° to 90° (not shown). In an analogous manner, the first restraining hook 10 can preferably likewise be rotated over a range from 0 to 90° in both directions about its operating position, if an external force such as may be produced by a passing container, a freight pallet or another item of freight is imposed on the first or second restraining hook.

Figure 3:
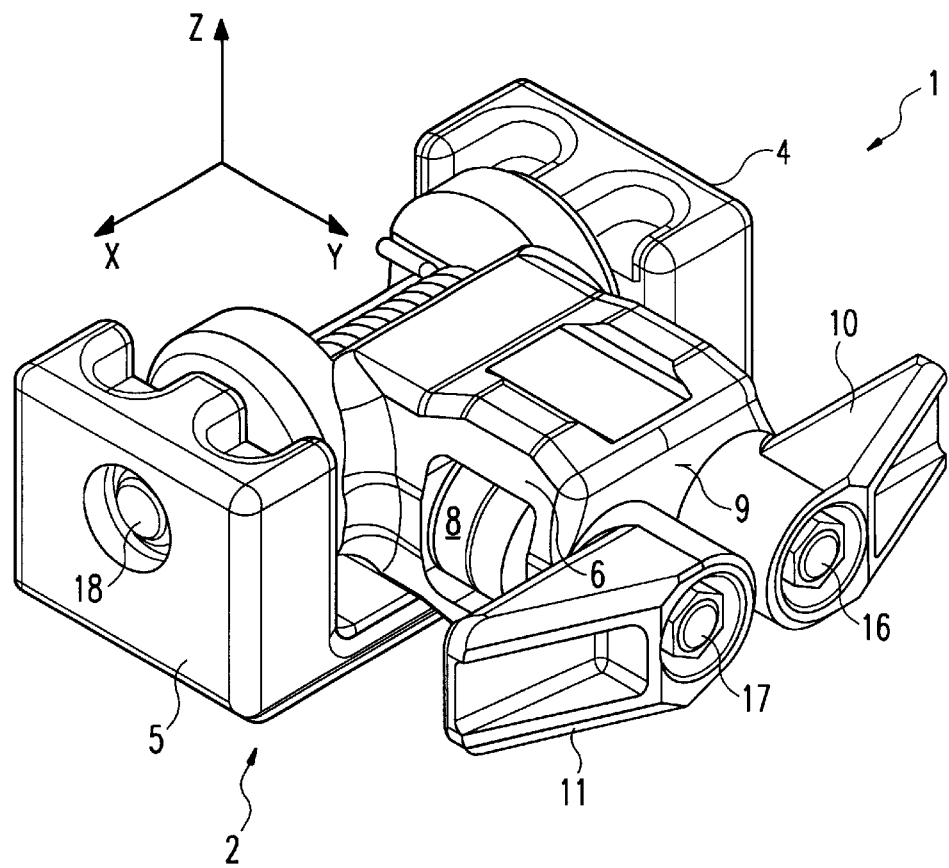
FIG. 3 is a perspective view of the cargo latch shown in FIG. 1 with the pivotable base pivoted through approximately 90° with respect to a frame of the latch.

FIG. 3 shows, in perspective, the cargo latch 1 shown in FIG. 1 with a base rotated out of its operating position, by approximately 90° in the Y direction with respect to the frame 2. The "folding away" of the base in the Y direction typically occurs when a container or the like approaching in the Y direction strikes the base 6 of the latch 1 and knocks the base 6 over, so that the container can pass over the latch 1 largely unhindered. In just the same way, the base can be pushed over in the direction opposite to the Y direction (not shown).

Figure 4:
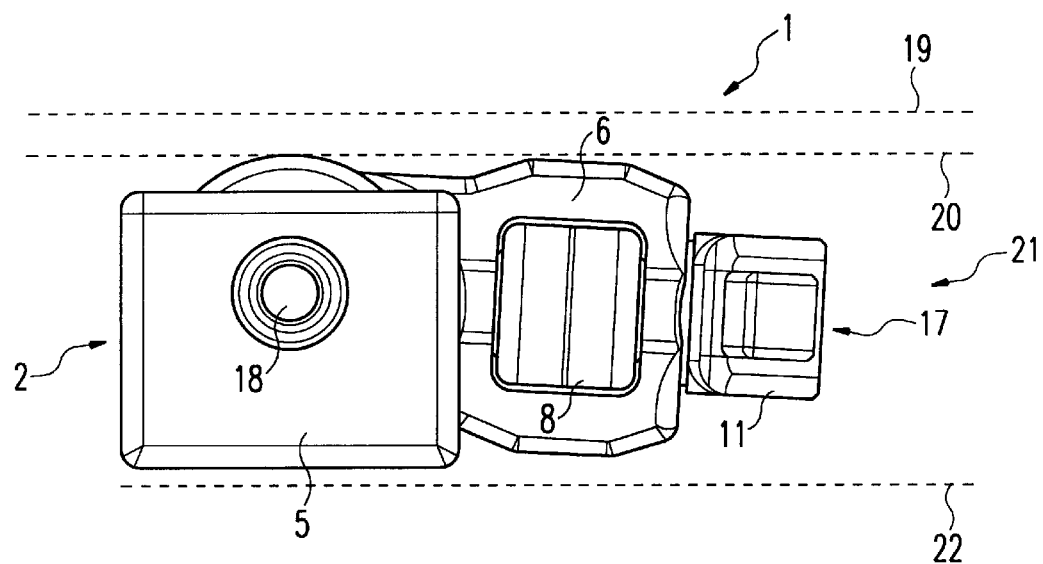
FIG. 4 is a side view of the latch shown in FIG. 3.

FIG. 4 shows the cargo latch 1 shown in FIG. 3 in a side view, revealing the arrangement of the latch 1 when it is folded down into a counter-floor space 21 below a floor 19 of the cargo hold. In FIG. 4 the dashed line 19 indicates the floor level of the cargo hold or the upper limit of the counter-floor space 21, the dashed line 20 indicates the upper edge of the latch 1 within the counter-floor space 21 when it is in the folded-down position, and finally the dashed line 22 indicates the lower limit of the counter-floor space 21.

Preferably, a plurality of cargo latches 1 in accordance with the invention are disposed along parallel lines in a counter-floor space below the floor of the cargo hold, in particular the cargo hold of an aircraft. The distance between the parallel lines along which the latches 1 are disposed preferably corresponds substantially to the distance of a so-called half container. Then, when a so-called whole container or a corresponding freight pallet or the like is brought into its final storage position, the whole container is conveyed between the left and right lines along which latches 1 in accordance with the invention are arranged. During this process each of two fixation strips provided one on the left and another on the right, preferably along the bottom of the whole container, extends below a left or a right restraining hook, and the base 6 of the first latch 1 on the line midway between the left and right lines is pushed over in the direction of transport. When the whole container is transported further, into its final storage position, the left and right holding strips extend below other left and right restraining hooks of latches 1 in accordance with the invention and other bases of latches on the line halfway between the left and right lines are pushed over. After the container has reached its final storage position, the latches 1 in accordance with the invention secure the whole container in place, in both the lateral and the vertical direction, against slippage out of the final storage position of the container. For additional fixation of the container further latches are preferably provided at its front and back ends.

When a container is being pushed into place it quite often happens that the holding strips of the container or the container itself are not quite accurately aligned, so that in the final storage position they are pressed against the base of a latch at a slight angle. In this case the base may folds away in the direction of movement of the container, and the container or its holding strips would become jammed between the retracting base and the restraining hook lodged above the holding strip if the restraining hook could not be turned away in a negative Y direction (see FIG. 1). Because the restraining hook can pivot in addition to and relative to the base, it is possible to bring the container into its final storage position without it or its holding strips becoming jammed against the base and the restraining hook. Once the container is substantially in its final storage position, the base of the latch in accordance with the invention may be able to swing upright again and the restraining hooks to pivot back into their operating position, overlapping the holding strips of the container, so as to enable secure holding of the container against lateral or vertical slippage. The base is preferably pivotable in both the clockwise and the counterclockwise direction. The same applies to the restraining hooks that are pivotably mounted on the base. This measure ensures that the container will not become jammed between two rows of cargo latches in accordance with the invention, regardless of whether the container is being conveyed into its final storage position from a first direction or from a direction opposite to the first direction. A substantially effortless pushing of the container into its final storage position is also, in particular, facilitated by the fact that the base of a cargo latch in accordance with the invention is provided with deflecting rollers that guide the holding strips on the container.

The preceding considerations apply equally to a so-called half container, in which case the half container is pushed between two immediately adjacent rows of cargo latches in accordance with the invention and, accordingly, no latches are tilted over along a middle line when the half container is being brought into its final storage position.

What is claimed is:

1. A cargo latch for restraining an object against movement with respect to a floor of a cargo hold; comprising:
   a frame;
   a first shaft fixedly mounted within the frame;
   a base comprising an upper end and a lower end which is rotatably mounted on the first shaft in order that the base can be pivoted with respect to the frame, wherein the base defines at least one bore having a lower end and an upper end, the lower end having a diameter that is larger than a diameter of the upper end;
   a restraining hook which is pivotally mounted to the upper end of the base; and
   a second shaft, which is matched in shape to that of the bore, rotatably mounted within the bore, wherein an upper end of the second shaft defines an external screw-thread.

2. The cargo latch of claim 1, wherein the externally threaded upper end of the second shaft has a defined diameter and a remaining part of the second shaft has a defined diameter, the diameter of the upper end being smaller than the diameter of remaining part to define a seating surface for the restraining hook on the second shaft at a boundary between the external screw-thread and the remaining part of the second shaft.

3. The cargo latch of claim 1, wherein the restraining hook is attached to the upper end of the second shaft by a self-locking nut and is rotatably seated on a flat surface defined by the base, the flat surface being located at the upper end of the base.

* * * * *